United States Patent [19]

Bawa

[11] 3,847,417

[45] Nov. 12, 1974

[54] ELECTRICAL FITTING

[75] Inventor: Jaspal S. Bawa, Elizabeth, N.J.

[73] Assignee: Thomas & Betts Corporation, Elizabeth, N.J.

[22] Filed: June 22, 1973

[21] Appl. No.: 372,467

[52] U.S. Cl................ 285/161, 174/65 R, 285/206
[51] Int. Cl.............................................. H02g 3/06
[58] Field of Search ........... 285/206, 161, 158, 205, 285/207; 174/65 R, 83

[56] References Cited
UNITED STATES PATENTS

| | | | |
|---|---|---|---|
| 1,669,190 | 5/1928 | Dunmire | 285/207 |
| 1,738,969 | 12/1929 | Selah | 285/207 X |
| 1,793,883 | 2/1931 | Church | 285/158 |
| 2,506,398 | 5/1950 | Thomas | 285/161 |
| 2,657,251 | 10/1953 | Bergan | 285/161 X |

Primary Examiner—Thomas F. Callaghan
Attorney, Agent, or Firm—Jesse Woldman; David Teschner

[57] ABSTRACT

An electrical fitting for connecting metallic conduit or armored cable to an outlet box or the like comprising a smoothly throated annular ring attached by a relatively narrow web portion to one end of an externally threaded hollow tubular body member which, in one embodiment, includes tab means attached thereto which engages a portion of the periphery of the annular ring at a point selectively spaced from the interconnecting web portion to maintain the ring in generally coaxial alignment with the body member. In another embodiment, the tab means is attached to the annular ring and engages the adjacent end of the body member. The smooth interior surface of the annular ring flares outwardly remote from the body member to provide a smooth exit for conductors drawn therethrough while additionally providing a convenient stop means for the conduit or the metallic sheath encompassing the conductors. In one embodiment the fitting may be stamped from a single piece of flat stock and thereafter roll formed to provide the desired configuration.

6 Claims, 3 Drawing Figures

ELECTRICAL FITTING

BACKGROUND OF THE INVENTION

1. Field of the Invention

The invention is directed to the field of electrical fittings and principally to an improved device for attaching metallic conduit or armored cable to an outlet box or the like.

2. Description of the Prior Art

Prior art electrical fittings adapted for joining metallic conduit or armored cable to an outlet box or the like generally comprise an externally threaded hollow tubular body member having a shoulder portion at one end arranged to abut a receiving hole from the outside of an outlet box or similar structure while an externally threaded nut was threaded about the externally threaded portion of the body member from the inside of the box to lock the fitting thereto. The interior of the body member was generally of uniform diameter and of such dimension as to provide a relatively close fit about the conduit or the armored cable. The insulation surrounding the conductors extending beyond the exit end of the fitting were often subject to severe abrasion or cuts caused by the relatively sharp edge defining such end of the fitting. Additionally, because of the uniform diameter of the interior of the fitting the end of the conduit or armored cable had to be accurately positioned within the fitting to prevent it from extending beyond the exit thereof and causing further damage to the conductor insulation. More recent prior art fittings of this type incorporated one or more tabs extending radially inwardly from the exit end of the body member towards the interior thereof in an attempt to provide a stop means for the metallic conduit or armor surrounding the insulated conductors. An alternative approach utilized an annular ring attached to the body member exit at one point by a single strut or web. Such tabs or rings were, however, generally unsatisfactory in that, firstly they terminated in a relatively sharp edge which often caused severe abrasion to the insulation surrounding the conductors extending therethrough and, secondly, they were readily subject to deformation and displacement in handling and use thereby failing to function properly as a stop means for the enclosed conduit or armor sheathing.

SUMMARY OF THE INVENTION

The invention overcomes the problems and limitations noted above with respect to prior art fittings by providing an improved electrical fitting having a smoothly interiorly contoured, reduced diameter annular ring connected to one end of a threaded hollow tubular body member to provide both a stop means for a metallic conduit or sheath encompassing one or more insulated conductors, and a smooth exit throat for the insulated conductors passing therethrough. The annular ring is maintained in position adjacent the end of the body member by an interconnecting web member and by one or more tabs extending between the body member and the periphery of the annular ring remote from the interconnecting web portion joining the ring to the body member. In an alternative embodiment, the annular ring is provided with a peripherally disposed groove and the body member tab free ends suitably contoured to engage such grooves to enhance the engagement between the tabs and the annular ring. It is therefore an object of this invention to provide an improved electrical fitting.

It is a further object of this invention to provide an electrical fitting having a smoothly contoured exit throat.

It is another object of this invention to provide an electrical fitting having a selectively contoured, reduced diameter annular ring attached to one end of the body member thereof to provide both a conduit stop means and a non-abrasive conductor exit therefor.

It is a further object of this invention to provide an electrical fitting having a smoothly throated annular ring connected to and disposed adjacent one end of a conduit receiving body member, and maintained in position by tabs extending between the ring and the body member.

It is still another object of this invention to provide an electrical fitting having an annular ring formed integrally with the body member thereof and maintained in position by tab means extending from the body member and engaging the periphery of the annular ring.

Other objects and features will be pointed out in the following description and claims and illustrated in the accompanying drawings which disclose, by way of example, the principle of the invention and the best mode contemplated for carrying it out.

BRIEF DESCRIPTION OF THE DRAWINGS

In the Drawings

Similar elements are given similar reference characters in each of the respective drawings.

DESCRIPTION OF THE PREFERRED EMBODIMENTS

Figure 1:
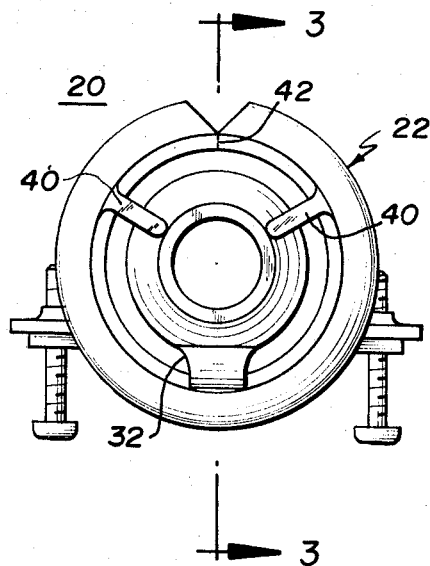
FIG. 1 is a front elevational view of an electrical fitting constructed in accordance with the concepts of the invention.
Figure 2:
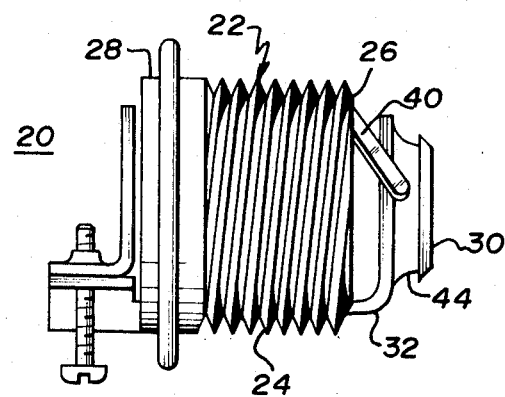
FIG. 2 is a side elevational view of the device of FIG. 1.
Figure 3:
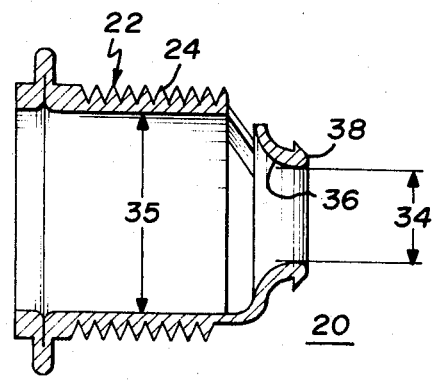
FIG. 3 is a fragmentary sectional view of the device of FIG. 1 taken along the lines 3—3 of FIG. 1.

Turning now to FIGS. 1, 2, and 3 there is shown an electrical fitting 20 constructed in accordance with the concepts of the invention. The fitting 20 comprises a generally hollow tubular body member 22 having an externally threaded portion 24 extending from a first end 26 of body member 22 towards a second end 28 thereof. Disposed in generally coaxial alignment with the longitudinal axis of the body member 22 is an annular ring 30 connected to the first end 26 of body member 22 by a web portion 32 which is formed preferably integrally with the body member 22 and connected to the periphery of the annular ring 30. Ring 30 has an inner diameter 34, while the body member 22 has an inner diameter 35 somewhat larger than the ring inner diameter 34 as may be more clearly seen in FIG. 3. Additionally, the annular ring 30 comprises a relatively smooth interior surface 36 flaring outwardly as at 38 (FIG. 3) to form a relatively smooth exit throat therefor. The annular ring 30 is maintained in position adjacent the first end 26 of body member 22 by preferably a pair of tabs 40 which extend outwardly from the first end 26 of body member 22 to engage the periphery of the annular ring 30. Alternatively, either a single such tab or more than two may be employed in similar fashion, if necessary or desirable. The tabs 40 may, of course, be formed integrally with or be attached to the ring 30 and extend outwardly therefrom to engage the body member 22 in like manner. In such case, slots or recesses (not shown) may be formed in the body member to accept the free ends of such tabs. To provide balanced support, the tabs 40 are arcuately offset preferably an equal distance in either direction from a center line extending radially from the center of the interconnecting web portion to the diametrically opposed end of the body member 22. In the event one such tab 40 is employed it should be located preferably generally diametrically opposite the interconnecting web portion 32. The tabs 40 may additionally be appropriately attached to the body member 22, or formed integrally therewith in a single stamping operation. Alternatively, the annular ring 30 and the body member 22 may be formed as an integral unit from a single piece of flat stock and the annular ring 30 thereafter folded up into position and the body member 22 rolled into the tubular configuration substantially as shown. In such case, the abutting ends of the body member 22 will form a seam such as 42 shown positioned diametrically opposite the interconnecting web portion 32. To further enhance the engagement between the tabs 40 and the annular ring 30 there may be provided a groove 44 peripherally disposed about the annular ring 30. The tabs 40 may then be suitably formed so that their free ends engage the groove 44 to provide interlocking engagement therebetween which will prevent both inward and outward displacement of the ring 30 during handling or use. Of course the annular ring 30 may be selectively formed without such groove 44 and the tabs 40 merely bent about the periphery of the annular ring 30 and slightly downwardly across the front thereof to provide the necessary engagement therebetween. By providing a smooth interior surface 36 in the annular ring 30, the insulated conductor wires (not shown) may be extended therethrough without danger of cutting or abrading the overlying insulation. The interior diameter 34 of the annular ring 30 is proportioned somewhat smaller than the interior diameter of the body member 22 to provide a stop for a metallic conduit or sheath having an external diameter approximating the inner diameter 35 of body member 22. As the metallic conduit or sheath is advanced within the body member 22, the free end thereof will abut the end of the annular ring generally adjacent the first end 26 of the body member 22 and be effectively prevented from further advancement. The wires extending from the end of the conduit or sheath may thus be advanced through the inner diameter 34 of the annular ring 30 into the interior of the outlet box to which the fitting 22 is fastened. The smoothed convex form of the interior surface 36 will insure that the wires inserted therethrough will pass smoothly along the surface 36 and be directed outwardly therefrom.

The embodiments of the invention in which an exclusive property or privilege is claimed are defined as follows:

1. An electrical fitting comprising: a generally hollow tubular body member having a given inner diameter, a first end, a second end, and an externally threaded portion extending from said body member first end a given length towards said body member second end; an annular ring having a given inner diameter less than said inner diameter of said body member and having a smooth tapered interior surface having a first portion adjacent said body member first end, said first portion having a convex form converging towards the axis of said annular ring and away from said body member first end, said interior surface having a second portion contiguous with said first portion and flaring outwardly adjacent the end of said annular ring remote from said body member, said annular ring being selectively axially spaced from and disposed generally adjacent said body member first end in coaxial alignment therewith, said annular ring being connected to said body member by a narrow web portion extending between said body member first end and the periphery of said annular ring; said body member, annular ring and web portion being formed integrally from the same material, and at least one tab means connecting said body member first end to the periphery of said annular ring at a point selectively spaced from said web portion to maintain said annular ring in a given position with respect to said body member first end.

2. An electrical fitting as defined in claim 1 wherein said tab means is formed integrally with said body member.

3. An electrical fitting as defined in claim 2 wherein the periphery of said annular ring has a groove therein, and said tab means comprises a selectively formed free end engaged within said groove.

4. An electrical fitting as defined in claim 3 further comprising two tab means formed integrally with said body member.

5. An electrical fitting as defined in claim 4 wherein said body member and said annular ring are formed integrally from a single piece of flat stock.

6. An electrical fitting as defined in claim 1 wherein said body member further comprises a shoulder portion disposed about the periphery thereof generally adjacent said body member second end.

* * * * *